United States Patent
Tsai et al.

(10) Patent No.: US 6,398,194 B1
(45) Date of Patent: Jun. 4, 2002

(54) WATER PRESSURE-TYPE AERATION DEVICE

(76) Inventors: Tsung-Hsin Tsai; Shih-Tse Wang, both of P.O. Box No. 6-57, Chung-Ho, Taipei 235 (TW)

( * ) Notice: Subject to any disclaimer, the term of this patent is extended or adjusted under 35 U.S.C. 154(b) by 0 days.

(21) Appl. No.: 09/450,010

(22) Filed: Nov. 29, 1999

(51) Int. Cl.[7] .................................................. B01F 3/04
(52) U.S. Cl. ..................... 261/36.1; 261/77; 261/120; 261/121.1; 261/124; 96/371
(58) Field of Search .......................... 261/36.1, 37, 77, 261/120, 121.1, 124, DIG. 75; 96/371

(56) References Cited

U.S. PATENT DOCUMENTS

| | | | | |
|---|---|---|---|---|
| 2,388,753 A | * | 11/1945 | Mallmann et al. | 261/77 |
| 3,109,288 A | * | 11/1963 | Gross | 261/121.1 |
| 3,704,008 A | * | 11/1972 | Ziegler | 261/121.1 |
| 4,005,015 A | * | 1/1977 | Boward, Jr. | 261/121.1 |
| 4,226,719 A | * | 10/1980 | Woltman | 261/77 |
| 5,437,784 A | * | 8/1995 | Meinecke et al. | 261/36.1 |
| 5,514,267 A | * | 5/1996 | Machiya et al. | 261/36.1 |
| 6,155,794 A | * | 12/2000 | Wu | 261/121.1 |
| 6,190,544 B1 | * | 2/2001 | Edwards | 261/37 |
| 6,264,176 B1 | * | 7/2001 | Dickman et al. | 261/77 |

* cited by examiner

*Primary Examiner*—C. Scott Bushey
(74) *Attorney, Agent, or Firm*—Troxell Law Office PLLC

(57) ABSTRACT

A water pressure-type aeration device including a water pump that generates powerful water pressure, with the water pumped through a water distribution head and a number of water distribution tubes which are placed throughout the water of a pond (or tank). The ends of the water distribution tubes are installed to cavitation housings, with the each of the cavitation housings connected at an angle of 90 degrees to the fresh air supply tubes which are directly conjoined to air filter and delivery devices floating on the surface of the water. When water is conveyed under pressure to the cavitation housings at the ends of the water distribution tubes, rear pressure constrictive openings in conjunction with a spray guide elements inside the housings generate powerful water pressure and the resulting friction across the tubular openings of fresh air supply tubes draw air in that is mixed with water in the cavitation housings and discharged from spray nozzles, thereby replenishing oxygen in the water. As such, the structure of the present invention promotes confluent activity in the water of a pond (or tank) that revitalizes the water into an oxygen-rich aquatic environment.

1 Claim, 2 Drawing Sheets

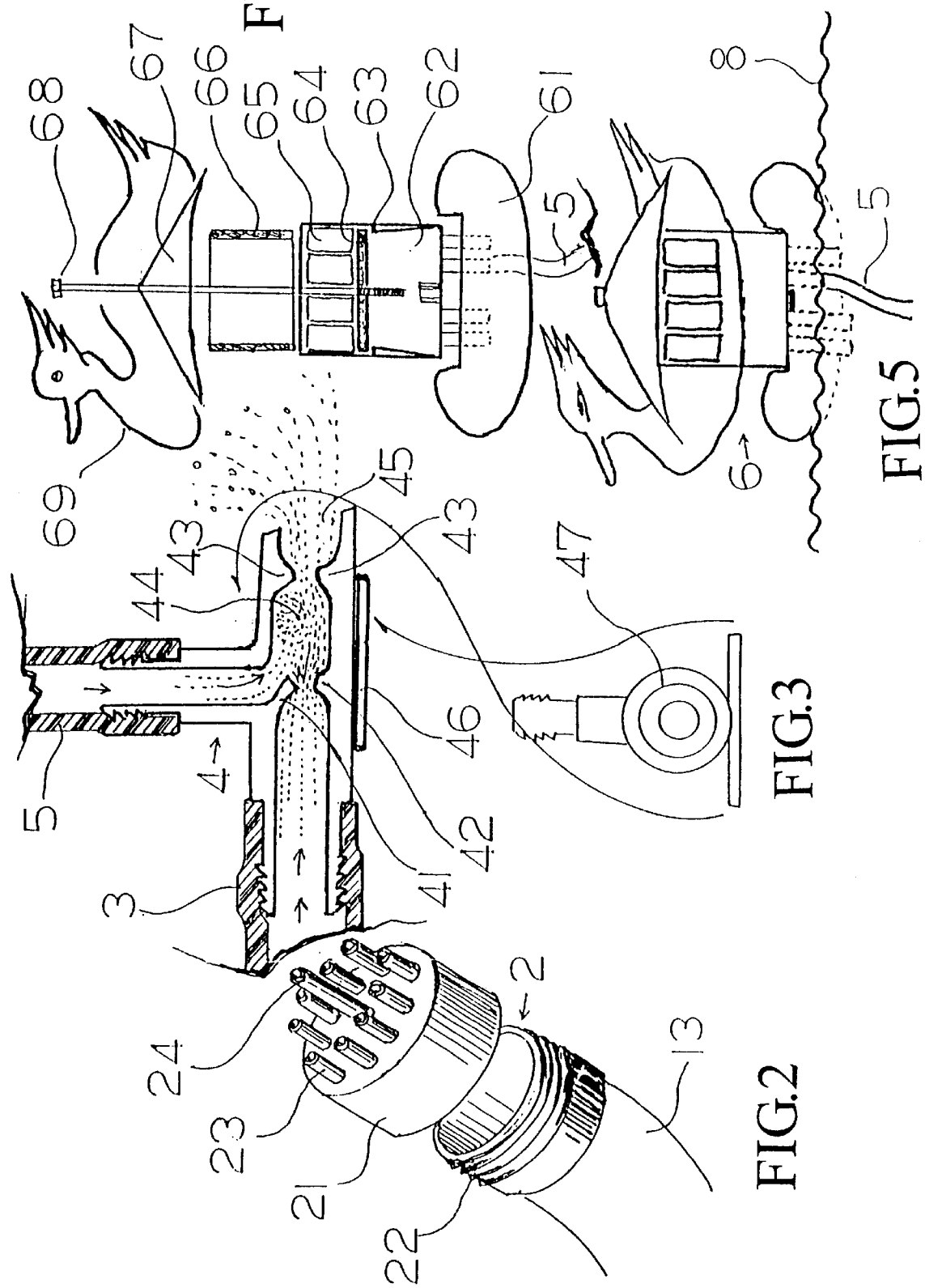

WATER PRESSURE-TYPE AERATION DEVICE

BACKGROUND OF THE INVENTION

1) Field of the Invention

The invention herein relates to a water pressure-type aeration device of an improved structure for aquaculture ponds (or tanks).

2) Description of the Prior Art

In improving the aquaculture pond (or tank) aeration and circulation approaches of the prior art, aquaculture ponds along coastlines, inland brackish water fish ponds, and indoor aquaculture tanks were observed. In ponds today, oxygenation is provided by utilizing the aeration paddle wheel method in which a radial wheel with scoop-like elements is rotated continuously to agitate the surface of the water into froth, thereby diffusing air to replenish oxygen and improve water quality. However, such methods are limited to a certain point on the surface of a body of water and, therefore, are partial coverage solutions. Aquaculture tanks, regardless of size, generally utilize two motors. One pumps water to a filtering basin which strains out foreign matter suspended in the water, while the other pumps air into the water, generating fine bubbles so that the water in tank absorbs oxygen by diffusion and provides for the sustaining of aquatic life. Yet even in this approach, the two motors are incapable of supplying oxygen to an entire area and the utilization of them in pairs to accomplish a single kinetic function is wasteful in terms of energy consumption.

In view of the said situation, the inventor of the invention herein innovated a water pressure-type aeration device, a single series system structure based on more than two years of research, with said structure capable of filtering water, supplying oxygen while simultaneously promoting water circulation and, furthermore, total surface area coverage.

Conventional water aeration devices now available on the market have the following shortcomings:

1. The paddle wheel agitation aeration method is only capable of operation on the surface of a body of water and, furthermore, has a single confined range. Its operation cannot be expanded to include the entire surface or extend into the lower depths of the water, which results in deep water oxygen deficiency that cannot be replenished and, furthermore, higher water temperatures.

2. In the water pump-type agitation aeration method, the operation of pumps produces noise, detracts from the scenery and, furthermore, accelerates the evaporation of water.

3. Air-pump type aeration devices deliver air directly into water and heated air is produced when such devices are utilized for prolonged periods, resulting in higher water temperature and reduced rates of oxygen absorption ; furthermore, since such devices are typically not equipped with air filtration systems, tainted air is introduced into the water, harming aquatic life and contaminating the water.

4. All of the said methods are incapable of impelling confluent circulation throughout the entire area of a pond (or tank) and providing aquatic life with an evenly distributed level of oxygenation throughout the body of water.

5. All of the said methods are incapable of the total area dispensation of pharmaceuticals to improve aquacultural conditions, which is a major drawback.

6. All of the said methods and structures waste materials (most are equipped with one or more motors) and energy, while remaining incapable of supplying oxygen throughout an entire area of water.

SUMMARY OF THE INVENTION

Therefore, in view of the existent shortcomings, the primary objective of the invention herein is to provide a water pressure-type aeration device powered by a single pump capable of total multifunctional utilization, with a water filtering basin on one side for water filtration and a water distribution head connected to a number of water distribution tubes on the other side for the conveyance of water supplied under pressure. Deployed throughout all areas of a pond (or an aquatic tank), the ends of the water distribution tubes are fed into cavitation housings, where filtered fresh air is drawn in from air filter and delivery devices, with the powerful water flow supplied generating a swirling impingement in mixture chambers that is discharged through spray nozzles, thereby diffusing oxygen and impelling water circulation throughout the entire body of water and achieving the goal of providing sufficient oxygen and re-circulation to sustain aquatic life.

Another objective of the invention herein is to provide a water pressure-type aeration device, the structure of which is comprised of four major sections: a land-installed water pump (or submerged water pump), a water distribution head, water distribution tubes and cavitation housings, and air filter and delivery devices that are assembled into single environmentally compatible system installed throughout a large or small pond (or tank).

BRIEF DESCRIPTION OF THE DRAWINGS

FIG. 2 is an exploded, perspective view of the water distribution head of the present invention.

FIG. 3 is a cross-sectional view of the cavitation housing of the present invention.

FIG. 4 is an exploded view of the delivery device of the present invention.

FIG. 5 is a side view of the delivery device of the present invention.

DETAILED DESCRIPTION OF THE INVENTION

Figure 1:
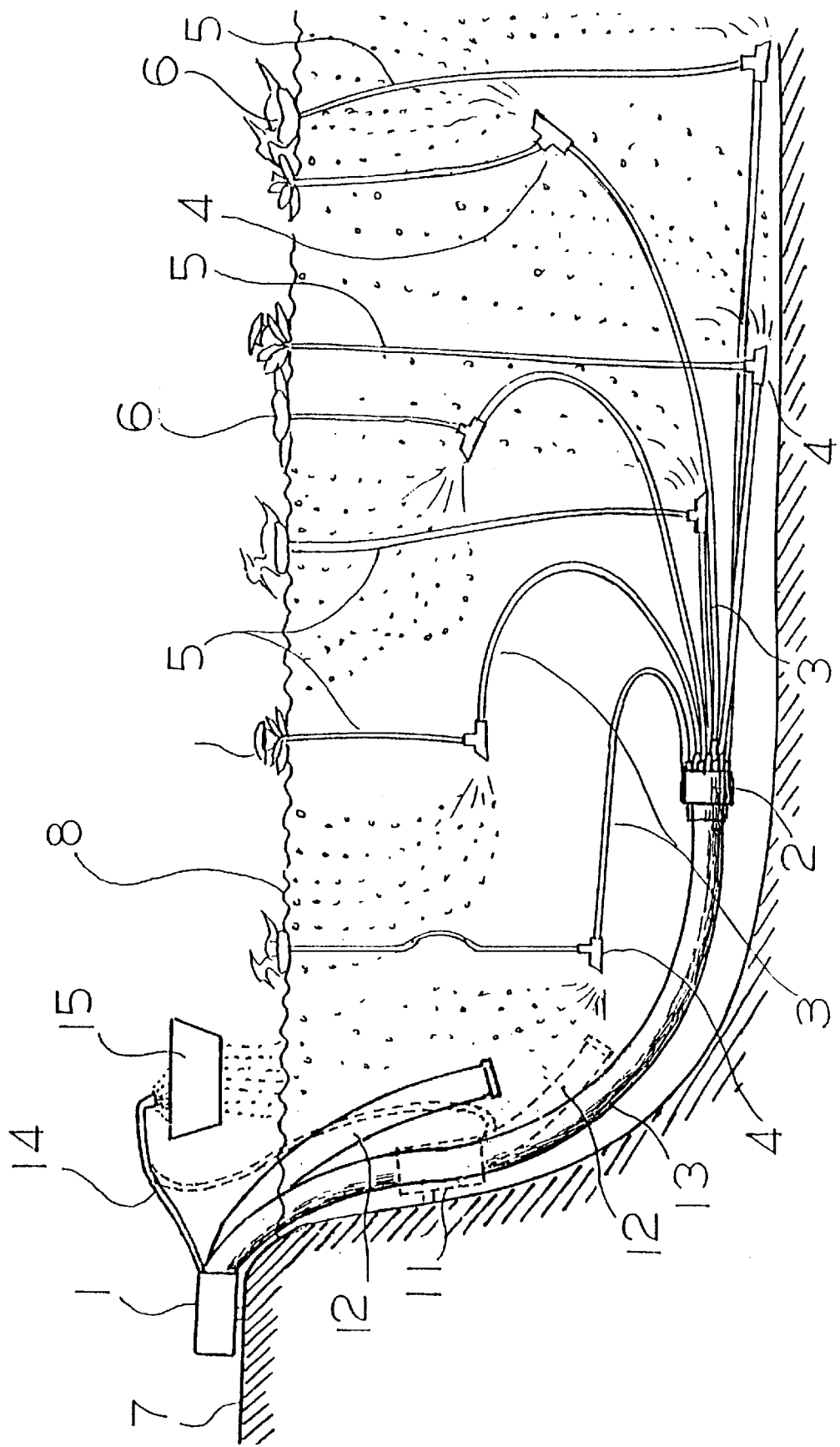
FIG. 1 is a drawing of the entire water pressure-type aeration device of the invention herein, as viewed from a lateral perspective.

Referring to FIGS. 1–5, the water pump 1 of the invention herein is placed on the pond banks 7 or can be a submerged water pump 11 situated below the water line such that water from the pond is drawn through an intake pipe 12 into the pump 1 or 11 which discharges it under pressure, with a small portion of the water directed through a filtered output pipe 14 and delivered into a water filtering basin 15, the water thereby becoming filtered and recirculated into the pond (or tank) to maintain water cleanliness and purity. A larger portion of the water evacuated under pressure is conveyed through an output pipe 13 to a water distribution head 2. Resembling the distributor cap of a conventional automobile engine, the water distribution head 2 is connected to the output pipe 13 at the rear, with connection achieved by a tightly rotated thread and washer fastening to prevent separation and pressure loss due to water flow leakage, on the front surface of the water distribution head cover 21 are a number of circularly disposed tubular connector fittings 12; the said tubular connector fittings 23 along the outer circumference of the water distribution head cover 21 are relatively short to facilitate operations during installation, while the center tubular connector fitting 24 is longer than the circularly disposed tubular connector fittings 23, with the differences in height facilitating the installation of the water distribution tubes 3.

The total diameters of all the water distribution tubes 3 cannot exceed the diameter of the output pipe 13 to maintain the magnitude of pressure, with the water distribution tubes 3 capable of withstanding the high water pressure from the output pipe 13 and conveying the supplied water to cavitation housings 4; the cavitation housings 4 are installed to the ends of the water distribution tubes 3 and are T-shaped tubular fixtures having formed inside a spray guide element 41 inclined in the direction of water flow; the said guide element 41 causes a slight reduction of the inner diameter, thereby deflecting the flow of water downward to generate turbulence, with the intake opening of a fresh air supply tube 5 situated immediately over this point, which is approximately one-third the distance away from the nearest end of the fixture, where an annular projection along the inner diameter in conjunction with the spray guide element 41 changes the width of the original diameter, reducing a section of the inner diameter and thereby forming a mixture chamber 44 in between a rear pressure constrictive opening 42 and a front pressure constrictive opening 43 near the spray nozzle 45 at the anterior such that when pressurized water flows forcefully out of the water distribution tube 3, the reduced flow volume effected by the rear pressure constrictive opening 42 results in an impedance that causes an instant raising of the water pressure and consequent increase in the momentum of the water surging through the smaller constrictive opening, at which time the flow passes by the connector opening of the fresh air supply tube 5, with the frictional action inducing air through the interior of the said tube and into the mixture chamber 44, where the air and water are swirled against each other to produce a cavitated wash that continues to stream after eddying through the front constrictive opening 43 to emerge from the spray nozzle 45 into the greater body of water of the pond. As such, fresh air is diffused into the depths of the water, and, furthermore, the branched arrangement of the water distribution tubes 3 supply the air in a comprehensive pattern; moreover, the discharge of the cavitational wash by the water distribution tubes 3 causes the originally still water to move about, giving rise to natural currents such that the pond becomes an aerated, coursing, and circulating body of water.

In addition to clearing dust and other particulates as well as foul odors in the air, the air filter and delivery device 6 of the invention herein is also capable of dispensing pharmaceutical liquids into the water via the fresh air supply tubes 5 and the cavitation housings 4; connected to the air filter and delivery device 6, the fresh air supply tubes 5 are extended vertically to the bottom of a pond (or tank) and then connected to the cavitation housings 4 at an angle of 90 degrees, situated on the underside of the air filter and delivery device 6 is an air filter and delivery device float 61 that provides for buoyancy and positioning on the surface 8 of the pond (or tank); a cylindrical recess is formed on the said float 61 for the placement of an air filter housing 62 having two interior diameters, with the lower section being of smaller diameter and the center section having an inner annular platform 63 formed along the inside utilized for installing an activated carbon filter screen element 64 that filters out fetid air and, if required, a pharmaceutical liquid can be added into the said device 6 for direct dispensation to each mixture chamber 44; at the same time, replacement is also convenient, the cylindrical hollow space extending to the upper section serves as an external air intake opening 65, with an outer dust filter screen hood 66 installed inside the said air intake opening 65 that functions as a separate initial filter which traps larger sized dust and dirt particulates in the air; after the air filter and delivery device 6 are assembled, a top protective cover 67 is installed over the upper extent to prevent the entry of falling dust or rain and, furthermore, the top protective cover 67 can be formed in the shape of a duck, lotus flower, or other artistic object 69 to enhance its appearance while floating on the surface of the water. Following completion of the entire assembly, a small hole is drilled though the middle for the insertion and fastening of a center threaded shaft 68, resulting in the final assembled structure of the air filter and delivery device 6.

The air filter and delivery device 6 of the invention herein can also be positioned on the ground along the banks of a pond, but each fresh air supply tube 5 connected to the underside of the fresh air filter and delivery device 6 must be cut to a length that allows for sufficient extension for connection to each cavitation housing 4 at the bottom of the pond (or tank) so that operation is possible. As such, the invention herein is of an innovative design capable of many new practical functions.

In summation of the foregoing sections, the present invention possesses the following advantageous:

1. The invention herein only utilizes a single water pump to save materials (motors), while also conserving energy (electric power) and maintenance manpower.

2. The invention herein is capable of increasing the speed of water current movement in a pond (or tank) and thereby reducing water temperature to maintain a balanced temperature.

3. Increases the level of water oxygenation, supplies sufficient oxygen volume required for biological and chemical processes, and rapidly breaks down organic waterborne matter, while also eliminating malodorous air and toxic gases to prevent the growth of contagious bacteria and pathogens.

4. If the dispensing of pharmaceutical liquids is required, such pharmaceuticals can be added into the air filter and delivery device 6 and cycled through the fresh air supply tubes 5 to the cavitation housings 4, where they are mixed and sprayed out to achieve balanced dissemination that is even in distribution, convenient, rapid, energy saving, and direct and, furthermore, effectively accomplished by the new and original structure of the present invention..

5. Replenishes fresh air through a cooling process that occurs as air is delivered through the fresh air supply tubes 5, enters into and is sprayed out of the cavitation housings 4 such that the temperature and oxygenation are stably balanced to maintain optimal water quality.

What is claimed is:

1. A water pressure aeration device comprised of:

a water pump equipped with two pipes that respectively convey the pumped water, of which a small pipe conveys water to a water filtering basin and another large outlet pipe conveys water under pressure to a water distribution head;

said water distribution head consists of a round cover that is connected to the end of said outlet pipe by a rotated thread and washer fastening means; said water distribution head cover has a number of short tubular connector fittings, with the fittings along an outer periphery of said cover being relatively short, while the tubular connector fitting at the center section of said cover is longer to facilitate installation;

a cavitation housing that is a T-shaped tubular fixture having at the bottom section a low planar stabilizer appendage; a water distribution tube is connected to one end of said tubular fixture, means forming a rear pressure constrictive opening is disposed posteriorly inside said cavitation housing, with a facing spray guide element inclined downward and situated between a fresh air intake opening of a vertically connected fresh air supply tube and said means for forming said rear pressure constrictive opening; said guide element is approximately one-third the distance away from the nearest end of the fixture, thereby functioning to increase pressure of the water column flowing through said, water distribution tube at said rear constrictive opening and, furthermore, said spray guide element deflects the water column downward; a front pressure constrictive opening is formed in said tubular fixture anterior to a spray nozzle; and a mixture chamber is formed in between said front and rear pressure constrictive openings such that after the water column flows through said rear pressure constrictive opening and passes both said spray guide element and the fresh air supply tube opening, fresh air is drawn into said mixture chamber and swirled into a cavitated wash and then discharged from said spray nozzle into the water of a pond or tank for utilization;

an air filter and delivery device consisting of an air filter and delivery device float situated on the underside that enables stable buoyancy on the surface of the water; an air filter housing is installed on said float that contains a horizontally placed activated carbon filter screen element, at the upper section of which is an air intake opening, an outer dust filter screen hood, a top protective cover, an air filter and delivery device decorative object, and a threaded shaft is inserted through the middle of the air filter and delivery device secured with a nut to fasten the assembled structure of the air filter and delivery device.

* * * * *